Patented June 21, 1938

2,121,183

UNITED STATES PATENT OFFICE 2,121,183

PROCESS FOR THE MANUFACTURE OF CONDENSATION PRODUCTS OF DICARBOXYLIC ACID ANHYDRIDES

Josef Binapfl, Krefeld-Uerdingen, Germany, assignor to I. G. Farbenindustrie Aktiengesellschaft, Frankfort-on-the-Main, Germany No Drawing. Application June 29, 1934, Serial No. 733,126. In Germany July 12, 1933

10 Claims. (Cl. 260—123)

The present invention relates to a process for the manufacture of valuable condensation products by condensing organic compounds, the aliphatic carbon atoms whereof are all combined with one another by a simple linking and in which at least one of these carbon atoms is combined with at least one hydrogen atom, with α,β-unsaturated aliphatic dicarboxylic acid anhydrides or compounds, which are converted into these anhydrides under the conditions of the respective reactions.

The following may be mentioned as examples of the above organic compounds: hydrocarbons of the paraffin series, such as butane, pentane, heptane, octane or paraffin oil, saturated cyclic hydrocarbons, such as cyclohexane, decahydronaphthalene and hydrogenated colophony, aromatic hydrocarbons with at least one open or closed saturated side chain, such as toluene, ethylbenzene, diethylbenzene, propylbenzene, isopropylbenzene, methylnaphthalene and tetrahydronaphthalene, ethers such as dibenzylether, aldehydes such as benzaldehyde, ketones such as acetophenone, cyclohexanone and 2-methylanthraquinone, heterocyclic compounds, such as picoline, quinoline and like substances of the type indicated.

Among the α,β-unsaturated aliphatic dicarboxylic acid anhydrides maleic anhydride, itaconic acid anhydride and citraconic acid anhydride are especially to be mentioned. Of the compounds capable of being converted into acid anhydrides under the conditions of the reaction maleic acid, fumaric acid, citraconic acid, itaconic acid, citric acid and mesaconic acid may be indicated.

In many cases it is of advantage to carry out the reaction in an inert solvent, such as, for example, benzene, dichlorobenzene and the like.

The reaction can be accelerated by employing elevated temperatures and if necessary pressure. The temperature during the reaction may vary according to the conditions. Good results were obtained with temperatures above 80° C., the upper limit being given only by the decomposition temperatures of the reaction components and by the resistivity of the construction material. In general especially good results were obtained with temperatures ranging from about 120° to about 350° C.

An acceleration of the reaction can likewise be effected by the addition of catalysts to the reaction mixture, for example by the addition of iodine, sulphur and the like. Catalysts of the Friedel-Crafts type, however, are not intended to be employed.

The formation of the condensation products, for example, in the case of toluene by means of maleic anhydride with the formation of benzyl succinic acid anhydride proceeds in accordance with the following scheme:

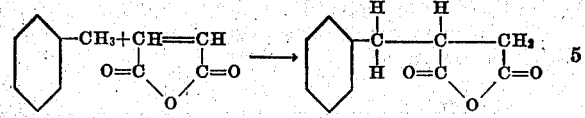

The following examples will serve to illustrate the invention; the parts being by weight:

Example 1

A mixture of 98 parts by weight of maleic anhydride, 1100 parts by weight of tetrahydronaphthalene and 0.3 part by weight of iodine is heated for 11–12 hours at 205–210° C. in an appropriate reaction vessel. Thereupon unchanged tetrahydronaphthalene and other foreign susbtances are removed by distillation.

About 200 parts by weight of a viscous yellowish brown mass are obtained as residue, only part of which can be distilled without decomposition.

The portion which can be distilled goes over as a viscous yellowish oil at 206–219° C. under a pressure of 4–7 mms. mercury gauge; this oil is acid in character and can form esters and salts. By direct titration it gives an acid value of 280. When heated with alcoholic potash it gives an acid value of 478, while for an addition product from tetrahydronaphthalene and maleic anhydride of the constitution $C_{14}H_{14}O_3$ an acid value of 486 is calculated.

The portion which does not distil is a mass resembling colophony, which on boiling with alcoholic potash gives an acid value of 470.

Example 2

A mixture of 900 parts by weight of ethylbenzene and 98 parts by weight of maleic anhydride is heated to 305–315° C. in the course of ½ hour in a pressure vessel. This temperature is maintained for about 40 minutes, thereby producing a pressure of about 32 atmospheres.

After cooling the resulting gaseous reaction products which are present in small quantities are blown off. The clear reaction mass is freed from remaining unchanged ethylbenzene by fractional distillation. Small quantities of unchanged maleic anhydride also distil over with the ethylbenzene. About 168 parts by weight of a viscous brown mass are obtained as residue, which on distillation under a pressure of 7–8 mms. mercury gauge at a temperature of 182–192° C. mainly goes over as a viscous yellowish oil (115 parts by weight).

The molecular weight determinations on this distillate gave a value of 195, while for a product of the constitution $C_{12}H_{12}O_3$ resulting from the interaction of one molecule of maleic anhydride with one molecule of ethylbenzene, the molecular weight of 204 is calculated. Elementary analysis of the compound gave the following values:

| | Per cent |
|---|---|
| Carbon | 70.70 |
| Hydrogen | 6.10 | calculated for $C_{12}H_{12}O_3$

| | Per cent |
|---|---|
| Carbon | 70.59 |
| Hydrogen | 5.88 |

The compound dissolves gradually in boiling water; the acid corresponding to the above anhydride separates on cooling from the resulting solution in the form of a white, finely crystalline precipitate, melting at 148–151° C. Molecular weight determination of the acid gave a value of 212, while for an acid of the composition $C_{12}H_{14}O_4$ a molecular weight of 222 is calculated.

Elementary analysis of the acid gave the following values:

| | Per cent |
|---|---|
| Carbon | 65.08 |
| Hydrogen | 6.42 | calculated for $C_{12}H_{14}O_4$

| | Per cent |
|---|---|
| Carbon | 64.87 |
| Hydrogen | 6.30 |

An acid value of 503 was found for the acid against a calculated value of 504 for a dicarboxylic acid of the constitution $C_{12}H_{14}O_4$. The acid is accordingly identical with the already known γ-methyl-γ-phenyl-pyrotartaric acid.

Example 3

A mixture of 848 parts by weight of ethylbenzene, 116 parts by weight of fumaric acid and 3 parts by weight of copper bronze is heated to 300–310° C. in the course of 25 minutes in an appropriate pressure vessel, thereby attaining a pressure of about 40 atmospheres. After cooling the resulting gaseous reaction products are blown off, whereupon the liquid reaction mass is separated from the copper bronze by filtration and the filtrate freed from the remaining unchanged ethylbenzene and fumaric acid anhydride by distillation. 100 parts by weight of a brownish highly viscous liquid are thus obtained as residue. This liquid distils almost completely in a vacuum of 8 mms. mercury gauge at 188–189° C. as a thick yellowish oil, which crystallizes gradually on prolonged standing.

Molecular weight determination of the new compound gave a value of 195, while for a compound of the composition $C_{12}H_{12}O_3$ resulting from the interaction with anhydride formation of one molecule of fumaric acid with one molecule of ethylbenzene a molecular weight of 204 is calculated.

Elementary analysis of the compound gave the following values:

| | Per cent |
|---|---|
| Carbon | 70.45 |
| Hydrogen | 5.69 | calculated for $C_{12}H_{12}O_3$

| | Per cent |
|---|---|
| Carbon | 70.59 |
| Hydrogen | 5.88 |

The compound crystallizes from ligroin in white flakes, melting at 79–80° C. It is rather difficultly soluble in cold ligroin and carbon disulphide, more readily soluble in benzene and ether. It dissolves gradually in boiling water. On cooling the resulting solution the acid corresponding to the above anhydride separates out in the form of a white, finely crystalline precipitate, melting at 148–151° C. Molecular weight determination gave a value of 209, while for an acid of the constitution $C_{12}H_{14}O_4$ a molecular weight of 222 is calculated.

Elementary analysis of the acid gave the following values:

| | Per cent |
|---|---|
| Carbon | 65.08 |
| Hydrogen | 6.42 | calculated for $C_{12}H_{14}O_4$

| | Per cent |
|---|---|
| Carbon | 64.87 |
| Hydrogen | 6.30 |

An acid value of 503 was found for the acid against the calculated value of 504 for a dicarboxylic acid of the constitution $C_{12}H_{14}O_4$. The acid is accordingly identical with the already known γ-methyl-γ-phenyl pyrotartaric acid of the following constitution

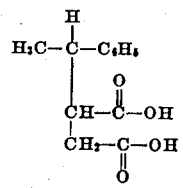

In an analogous manner γ-phenyl-γγ-dimethyl-pyrotartaric acid or the anhydride thereof can be obtained from isopropylbenzene and fumaric acid.

Example 4

A solution of 98 parts by weight of maleic anhydride in 1000 parts by weight of dry acetophenone is heated to boiling for about 14 hours under reflux after the addition of 0.3 part by weight of iodine. Thereupon foreign substances present and unchanged starting material are removed from the yellowish brown reaction mixture by filtration and finally by distillation. About 150 parts by weight of a viscous yellowish brown residue are thus obtained and the residue is then treated with dilute sodium carbonate solution with the simultaneous introduction of steam. The resulting yellowish brown solution is separated from small amounts of unsaponified products and is boiled for a short time after the addition of animal charcoal.

After filtering and acidifying with dilute sulphuric acid a bright, somewhat yellowish product is obtained which is acid in character; it gave the acid value of 500. By repeated recrystallization from alcohol with the addition of decolorizing carbon it is obtained in fairly colorless crystals.

Example 5

1000 parts by weight of cyclohexanone are heated with stirring with 98 parts by weight of maleic anhydride in an appropriate pressure vessel for about 2 hours to 230–240° C.

After cooling the resulting gaseous reaction products are blown off and unaltered starting material, high boiling by-products as well as water formed by the reaction, are separated from the reaction mixture.

140 parts by weight of a yellowish brown, resinous residue are thus obtained which for the greater part dissolves in boiling dilute sodium carbonate solution; the resulting yellowish brown solution is boiled for some time with the addition of decolorizing carbon and on acidifying a yellowish brown, flocculent precipitate separates.

The precipitate forms a yellowish brown residue, which is acid in character and on prolonged boiling (1 hour) with alcoholic potash gives an acid value of 349; it is readily soluble in benzene and very difficultly soluble in ligroin.

Example 6

900 parts by weight of dibenzylether are heated to 285–290° C. with 130 parts by weight of maleic anhydride in an autoclave provided with a copper lining during about 35–40 minutes. A pressure of about 40 atmospheres is thus obtained. After cooling the gaseous reaction products are blown off, whereupon the components of the liquid, brownish colored reaction mixture are separated by fractional distillation. 100 parts by weight of toluene, 260 parts by weight of benzaldehyde, 98 parts by weight of crude γ-phenyl-pyrotartaric acid anhydride and 465 parts by weight of unaltered dibenzylether are thus obtained. By recrystallization from ligroin the γ-phenyl-pyrotartaric acid anhydride separates in the form of lustrous needles melting at 97–98° C. The anhydride dissolves gradually in boiling water. On cooling the already known γ-phenyl-pyrotartaric acid, melting at 160–161° C., separates from the solution.

Example 7

800 parts by weight of heptane (boiling point 98–100° C.) are heated to 305–310° C. with 98 parts by weight of maleic anhydride in the presence of 3 parts by weight of iodine in an appropriate pressure vessel during 40 minutes. A pressure of about 60 atmospheres is thus obtained. After cooling the resulting gaseous reaction products are blown off. The remaining unaltered portions of heptane and maleic anhydride are then removed from the reaction mixture by distillation. A resinous, yellowish brown mass remains as residue, which does not distil unchanged and which on boiling with caustic soda lye produces a yellowish sodium salt. It gives a saponification value of 495, while a reaction product of the constitution $C_{11}H_{18}O_3$ from one molecule of heptane and one molecule of maleic anhydride gives a calculated saponification value of 565.

By employing 1100 parts by weight of paraffin oil in place of heptane 120 parts by weight of a dark brown reaction product possessing a saponification value of 240 are obtained. This product is readily soluble in benzene and ether. By treating the product with concentrated caustic soda lye a crystalline magma results, which consists essentially of the sodium salt of the carboxylic acid corresponding to the anhydride primarily obtained.

Example 8

A mixture of 1100 parts by weight of dry decahydronaphthalene and 60 parts by weight of citraconic acid anhydride is heated to 290–300° C. in the presence of 0.3 part by weight of iodine in an appropriate pressure vessel for one hour, whereby a pressure of 30 atmospheres is obtained.

After cooling the resulting gaseous reaction products are blown off and unaltered starting material removed by distillation. About 50 parts by weight of a yellowish brown, viscous residue are obtained as the reaction product, only part of which can be distilled without decomposition.

The portion which distils (15 parts by weight, boiling point 204–209° C. under 6–7 mms. mercury gauge) is a viscous, yellowish oil possessing an acid value of 446.

The resinous portion which does not distil gives an acid value of 435.

Example 9

A solution of 700 parts by weight of hydrogenated colophony (acid value 167, softening point 43–44° C.) in 300 parts by weight of dry benzene is mixed with 98 parts by weight of maleic anhydride and heated to 210–230° C. in a pressure vessel with stirring for about 5–6 hours. After cooling the resulting gaseous reaction products are blown off and the viscous reaction mass freed from benzene and undecomposed maleic anhydride by means of steam.

A bright amorphous residue is obtained, which yields a clear yellowish resin after melting. In contradistinction to the starting material it gives the following changed values: acid value 246, softening point 88–89° C.

Example 10

At a temperature of 340–350° C. and an overpressure of 30–40 mms. water gauge a mixture of 98 parts by weight of maleic anhydride and 700 parts by weight of isopropylbenzene is led through a quartz pipe filled with pieces of quartz. Besides a small quantity of gaseous reaction products a clear yellowish liquid reaction mass is formed which by distillation is freed from unchanged isopropylbenzene and maleic anhydride. About 25 parts by weight of a viscous brown mass are obtained as residue which on distillation under a pressure of 3–4 mms. mercury gauge at a temperature of 170–171° C. goes over as a yellowish viscous oil.

Molecular weight determination of this distillate gave a value of 218, the same molecular weight being calculated for a product of the constitution $C_{13}H_{14}O_3$ resulting from the interaction of one molecule of maleic anhydride and one molecule of isopropylbenzene.

Elementary analysis of the compound gave the following values:

|  | Per cent |
|---|---|
| Carbon | 71.40 |
| Hydrogen | 6.40 | calculated for $C_{13}H_{14}O_3$

|  | Per cent |
|---|---|
| Carbon | 71.56 |
| Hydrogen | 6.42 |

The compound dissolves in boiling water. The acid corresponding to the above anhydride separates on cooling from the solution in form of a white finely crystallized precipitate melting at 150–151° C. An acid value of 474 was found for the acid, the same acid value being calculated for a dicarboxylic acid of the constitution $C_{13}H_{16}O_4$. The acid accordingly will be a γ-phenyl-γγ-dimethyl-pyrotartaric acid.

The structural formulae given in the present application are, to the best of applicant's knowledge and belief, correct. However, it has been impossible to definitely determine that they are correct. Therefore, in case it is subsequently found that the structural formulae, or any of them, employed in the appended claims do not in fact correctly define the new products disclosed herein, then and in that event applicant wishes it to be understood that he intended that such formulae should define the products obtainable in accordance with the disclosure of this application.

I claim:

1. Process for the manufacture of a substituted succinic acid anhydride consisting in causing an aromatic compound containing at least one aliphatic side chain with at least one carbon atom carrying at least one hydrogen atom and all the aliphatic carbon atoms of the compound being connected by single bonds, said compound containing no hydroxyl group, to react on material selected from the group consisting of an α,β-unsaturated dicarboxylic acid anhydride and a compound forming an α,β-unsaturated dicarboxylic acid anhydride under the reaction conditions at a temperature above 80° C.

2. Process for the manufacture of a substituted succinic acid anhydride consisting in causing an aromatic compound containing at least one aliphatic side chain with at least one carbon atom carrying at least one hydrogen atom and all the aliphatic carbon atoms of the compound being connected by a single bond, said compound containing no hydroxyl group, to react on material selected from the group consisting of an α,β-unsaturated dicarboxylic acid anhydride and a compound forming an α,β-unsaturated dicarboxylic acid anhydride under the reaction conditions at a temperature ranging from about 120 to about 350° C.

3. Process for the manufacture of a substituted succinic acid anhydride consisting in causing an aromatic compound containing at least one aliphatic side chain with at least one carbon atom carrying at least one hydrogen atom and all the aliphatic carbon atoms of the compound being connected by a single bond, said compound containing no hydroxyl group, to react on α,β-unsaturated dicarboxylic acid anhydride at a temperature ranging from about 120 to about 350° C.

4. Process for the manufacture of a substituted succinic acid anhydride consisting in causing a mononuclear aromatic compound containing at least one aliphatic side chain with at least one carbon atom carrying at least one hydrogen atom and all the aliphatic carbon atoms of the compound being connected by a single bond, said compound containing no hydroxyl group, to react on α,β-unsaturated dicarboxylic acid anhydride at a temperature ranging from about 120 to about 350° C.

5. Process for the manufacture of a substituted succinic acid anhydride consisting in causing a mononuclear aromatic hydrocarbon containing at least one aliphatic side chain with at least one carbon atom carrying at least one hydrogen atom and all the aliphatic carbon atoms of the compound being connected by a single bond, to react on α,β-unsaturated dicarboxylic acid anhydride at a temperature ranging from about 120 to about 350° C.

6. Process consisting in causing an aromatic hydrocarbon containing at least one saturated side chain, to react on an α,β-unsaturated aliphatic dicarboxylic acid anhydride at a temperature ranging from about 120 to about 350° C.

7. Process consisting in causing a mononuclear aromatic hydrocarbon containing at least one saturated side chain, to react on an α,β-unsaturated aliphatic dicarboxylic acid anhydride at a temperature ranging from about 120 to about 350° C.

8. Process consisting in causing a mononuclear aromatic hydrocarbon containing at least one saturated side chain, to react on maleic anhydride at a temperature ranging from about 120 to about 350° C.

9. Process consisting in causing tetrahydronaphthalene to react on citraconic acid at a temperature of 290–300° C. and at a pressure of about 30 atmospheres in the presence of iodine.

10. A product obtainable by reacting with tetrahydronaphthalene on maleic anhydride in the presence of iodine at a temperature of 205–210° C., this product forming a viscous yellowish oil distilling at 206–219° C. under a pressure of 4–7 mms. mercury gauge and having an acid value of 280.

JOSEF BINAPFL.